United States Patent
Parekh et al.

(10) Patent No.: US 8,483,124 B2
(45) Date of Patent: *Jul. 9, 2013

(54) SYSTEM AND METHOD FOR DATA PACKET TRANSPORT IN HYBRID WIRELESS COMMUNICATION SYSTEM

(75) Inventors: Nileshkumar J. Parekh, San Diego, CA (US); Nikhil Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 466 days.

This patent is subject to a terminal disclaimer.

(21) Appl. No.: 11/757,765

(22) Filed: Jun. 4, 2007

(65) Prior Publication Data

US 2007/0237111 A1    Oct. 11, 2007

Related U.S. Application Data

(63) Continuation of application No. 10/077,650, filed on Feb. 14, 2002, now Pat. No. 7,230,936.

(60) Provisional application No. 60/340,500, filed on Dec. 14, 2001.

(51) Int. Cl.
*H04W 4/00* (2009.01)
*H04B 7/216* (2006.01)
*H04J 3/16* (2006.01)

(52) U.S. Cl.
USPC ............ 370/328; 370/335; 370/342; 370/466

(58) Field of Classification Search
None
See application file for complete search history.

(56) References Cited

U.S. PATENT DOCUMENTS

| | | | |
|---|---|---|---|
| 4,901,307 A | 2/1990 | Gilhousen et al. | |
| 5,668,875 A | 9/1997 | Brown et al. | |
| 5,978,478 A | 11/1999 | Korematsu | |
| 6,229,808 B1 | 5/2001 | Teich et al. | |
| 6,278,697 B1 * | 8/2001 | Brody et al. | 370/310 |
| 6,314,284 B1 | 11/2001 | Patel et al. | |
| 6,320,873 B1 * | 11/2001 | Nevo et al. | 370/466 |
| 6,442,401 B1 * | 8/2002 | Behan | 455/552.1 |
| 6,487,406 B1 * | 11/2002 | Chang et al. | 455/422.1 |
| 6,526,033 B1 * | 2/2003 | Wang et al. | 370/338 |
| 6,526,034 B1 * | 2/2003 | Gorsuch | 370/338 |
| 6,545,992 B2 * | 4/2003 | Naqvi et al. | 370/335 |
| 6,584,310 B1 | 6/2003 | Berenzweig | |

(Continued)

FOREIGN PATENT DOCUMENTS

| | | |
|---|---|---|
| CL | 2865-2002 | 12/2002 |
| CL | 2866-2002 | 12/2002 |

(Continued)

OTHER PUBLICATIONS

International Search Report—PCT/US02/039687—European Patent Office—Jun. 3, 2003.

(Continued)

*Primary Examiner* — Melanie Jagannathan
(74) *Attorney, Agent, or Firm* — Florin C. Corie; Peng Zhu

(57) ABSTRACT

Computer data is transferred between a CDMA radio access network and a GSM core infrastructure using a switch that acts on the CDMA side as a packet data serving node (PDSN) element and on the GSM side as a serving GPRS service node (SGSN) element. Switching message sequences and protocol stacks are disclosed.

52 Claims, 7 Drawing Sheets

U.S. PATENT DOCUMENTS

| | | | |
|---|---|---|---|
| 6,608,832 B2 * | 8/2003 | Forslow | 370/353 |
| 6,681,111 B2 | 1/2004 | Ahn et al. | |
| 6,708,031 B2 | 3/2004 | Purnadi et al. | |
| 6,721,565 B1 * | 4/2004 | Ejzak et al. | 455/436 |
| 6,741,868 B1 * | 5/2004 | Park et al. | 455/552.1 |
| 6,928,558 B1 | 8/2005 | Allahwerdi et al. | |
| 6,987,751 B2 | 1/2006 | Jain et al. | |
| 7,075,904 B1 * | 7/2006 | Manish et al. | 370/312 |
| 7,155,526 B2 | 12/2006 | Chaudhary et al. | |
| 7,230,936 B2 * | 6/2007 | Parekh et al. | 370/328 |
| 8,018,905 B2 | 9/2011 | Parekh | |
| 2002/0061745 A1 | 5/2002 | Ahn et al. | |
| 2002/0168960 A1 | 11/2002 | Jacobson et al. | |
| 2002/0173320 A1 | 11/2002 | Aitken et al. | |
| 2003/0114155 A1 | 6/2003 | Jain et al. | |
| 2003/0133425 A1 | 7/2003 | Radhakrishnan et al. | |
| 2006/0050680 A1 | 3/2006 | Naim et al. | |
| 2007/0060106 A1 | 3/2007 | Haverinen et al. | |
| 2008/0242264 A1 | 10/2008 | Malik et al. | |

FOREIGN PATENT DOCUMENTS

| | | |
|---|---|---|
| EP | 1107467 | 6/2001 |
| GB | 2333012 | 7/1999 |
| JP | 7307982 A | 11/1995 |
| JP | 19979503895 | 4/1997 |
| JP | 2001-230816 | 8/2001 |
| JP | 2001255819 | 9/2001 |
| TW | 357515 | 5/1999 |
| TW | 371824 | 10/1999 |
| TW | 466838 | 12/2001 |
| WO | WO9916266 A1 | 4/1999 |
| WO | 0013441 | 3/2000 |
| WO | WO0013440 | 3/2000 |
| WO | WO0110146 A1 | 2/2001 |
| WO | WO0131840 A1 | 5/2001 |
| WO | WO0141470 A2 | 6/2001 |

OTHER PUBLICATIONS

Inter-Operability Specification (IOS) for High Rate Packet Data (HRPD) Access Network Interfaces- Revision 0 (Post SDO Ballot, Pre-SDO Publication Version), Nov. 2001, 3GPP2 A.S0007-0 Version 2.0.

Anonymous: "Interoperability Specification (IOS) for CDMA 2000 Access Network Interfaces—Part 1 Overview Revision 0 (3G IOSv4.2) (SDO Ballot Version) A.S0022-0v1.0" 3GPPS, Nov. 16, 2001, XP002592565 Internet Publication * p. 12; figures 3.2-1*.

Supplementary European Search Report—EP02799231, Search Authority—Munich Patent Office, Jul. 20, 2010.

* cited by examiner

SYSTEM AND METHOD FOR DATA PACKET TRANSPORT IN HYBRID WIRELESS COMMUNICATION SYSTEM

RELATED APPLICATIONS

This application is a continuation of U.S. patent application Ser. No. 10/077,650, filed Feb. 14, 2002, now pending, which in turn claims the benefit of priority of U.S. Provisional Patent Application entitled "Method and Apparatus for Data Packet Transport in a Wireless Communication System Consisting of CDMA2000 Radio Access Network and GPRS Core Network", Ser. No. 60/340,500, filed Dec. 14, 2001. The foregoing described applications are herein incorporated by reference in their entirety.

I. FIELD OF THE INVENTION

The present invention relates generally to wireless communication systems, and more particularly to systems that use a CDMA radio access network with a GSM core network.

II. BACKGROUND

Code division multiple access (CDMA) is a digital wireless technology that inherently has relatively greater bandwidth capacity, i.e., that inherently permits the servicing of more telephone calls per frequency band, than other wireless communication technologies. Moreover, the spread spectrum principles of CDMA inherently provide secure communications. U.S. Pat. No. 4,901,307, incorporated herein by reference, sets forth details of a CDMA system, which can be used to transmit both voice calls and non-voice computer data.

Despite the advantages of CDMA, other wireless systems exist that use other principles. For example, in much of the world GSM is used, which employs a version of time division multiple access.

Whether CDMA principles or other wireless principles are used, wireless communication systems can be thought of as having two main components, namely, the wireless radio access network (RAN) and the core infrastructure which communicates with the RAN and with external systems, such as the public switched telephone network (PSTN), the Internet (particularly although not exclusively for data calls), etc. The core infrastructures associated with the various wireless technologies can be very expensive, both in terms of hardware and in terms of developing communication protocols to support particularized, typically system-specific call switching, subscription and attendant authentication and call monitoring, and billing. Consequently, the communication protocols of one wireless system (in the case of GSM, GSM protocols, and in the case of CDMA such as cdma2000-1x, IS-41 protocols) may not be compatible with those of another system without expensively prohibitive alterations in the core infrastructure of one system or the other.

From the disclosure above, the present invention recognizes that it would be desirable to enable the use of a CDMA-based RAN, with its attendant advantages, with a GSM-based core infrastructure, because GSM is extant in much of the world. The present invention still further recognizes, in light of the above, the desirability of minimizing if not eliminating the need to modify the communication protocols of the GSM core infrastructure.

Of particular focus in the present invention is the transport of non-voice computer data from a mobile station (MS) to a core infrastructure. In a CDMA system the MS can be a telephone, laptop computer, or other CDMA device that communicates digital data over the CDMA wireless RAN to a CDMA core infrastructure, which includes a packet data serving node (PDSN) that conveys the data to, e.g., the Internet using packet data call procedures that are part of the IS-41 protocols. In a GSM system the MS conveys digital data over the GSM RAN to a GSM core infrastructure. Until GSM begins deployment of so-called wideband CDMA, and even afterward for those service providers who will not be able to use wideband CDMA because of frequency spectrum limitations, the computer data transmission portion of the GSM infrastructure will continue to be a so-called GPRS infrastructure. The GPRS computer data infrastructure includes, for each base station system (BSS) of the GSM RAN, a corresponding serving GPRS service node (SGSN) coupled to a central gateway GPRS service node (GGSN). The SGSN and GGSN cooperate to convey the computer data using GSM protocols. The problem addressed by the present invention is how to transmit computer data using a CDMA RAN in combination with a GSM core infrastructure, without requiring excessive modifications to the GSM core infrastructure.

SUMMARY OF THE INVENTION

A switch for supporting wireless communication includes a first element communicating with a code division multiple access (CDMA) radio access network (RAN) using CDMA protocol. The switch also has a second element communicating with a GSM core infrastructure using GSM protocol. The first and second elements communicate with each other, such that use of the CDMA RAN with the GSM core infrastructure is facilitated.

In a preferred embodiment, the first element is a packet data serving node (PDSN) element and the second element is a serving GPRS service node (SGSN) element. The SGSN element can communicate with a gateway GPRS service node (GGSN), and the PDSN element can communicate with a CDMA base station controller (BSC). In a particularly preferred embodiment, the switch transfers computer data between the CDMA RAN and GSM core infrastructure. In one preferred, non-limiting implementation, the switch terminates point-to-point protocol (PPP) framing from the CDMA RAN and sends Internet Protocol (IP) to the GSM core infrastructure in response to selection of IP by a user of a CDMA mobile station communicating with the CDMA RAN.

In another aspect, a method for facilitating the use of a CDMA RAN with a GSM core infrastructure includes at least one of: terminating point-to-point protocol (PPP) framing from the CDMA RAN and sending Internet Protocol (IP) to the GSM core infrastructure in response to selection of IP by a user of a CDMA mobile station communicating with the CDMA RAN, and/or initiating packet data protocol (PDP) context activation from the CDMA mobile station.

In another aspect, data required to create a PDP context is received from a GSM home location registry (HLR) so that PDP context can be established without changing the CDMA standard and more particularly without changing cdma2000 1x.

In still another aspect, a wireless data communication system includes a CDMA RAN, a GSM core infrastructure, and a switch interconnecting the CDMA RAN and GSM core infrastructure. As disclosed further below, the switch receives and transmits computer data using CDMA protocol to the CDMA RAN. Also, the switch receives and transmits computer data using GSM protocol to the GSM core infrastructure.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
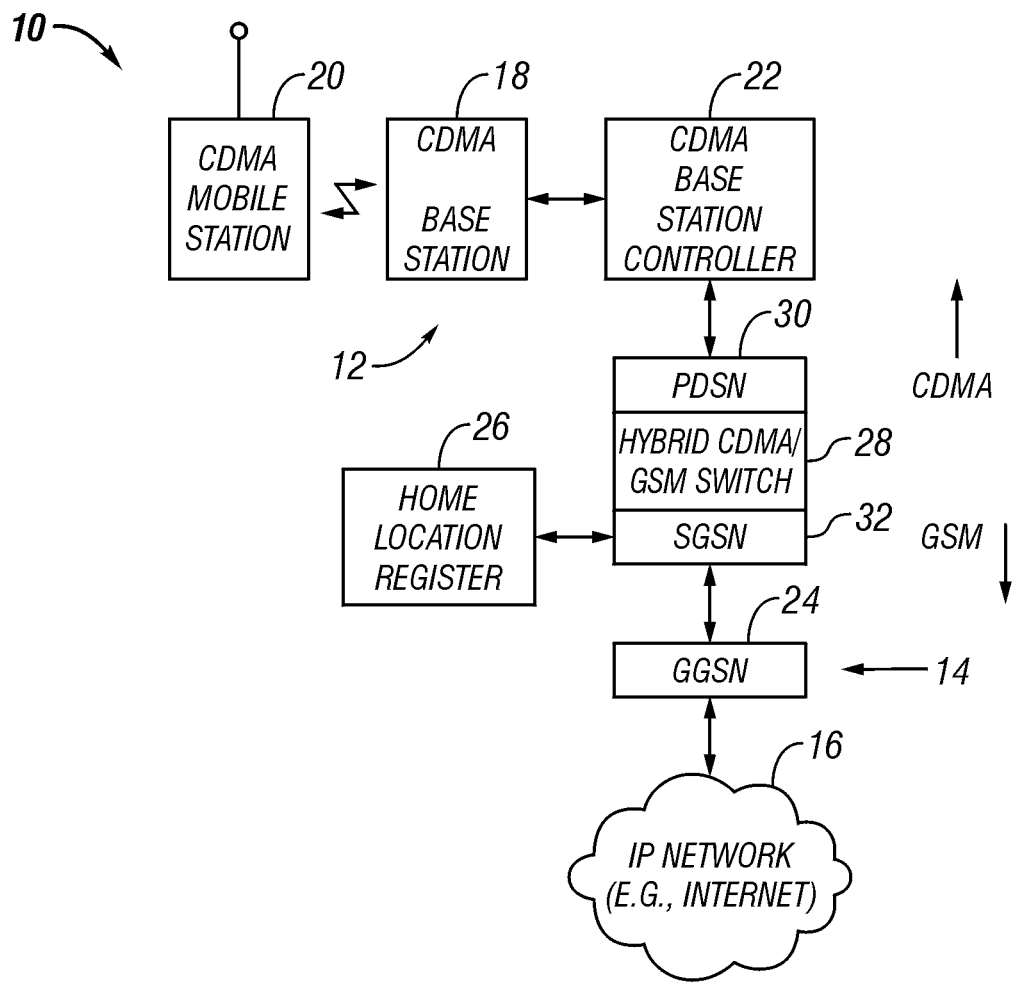
FIG. 1 is a block diagram of the present system for facilitating data transfer using a CDMA radio access network and a GSM core infrastructure.

Referring initially to FIG. 1, a system is shown, generally designated 10, for facilitating communication, and particularly computer data communication, between a code division multiple access (CDMA) radio access network (RAN), generally designated 12, and a GSM core infrastructure, generally designated 14. In turn, the GSM core infrastructure 14 can communicate with a data network such as an IP network 16, e.g., the Internet.

As shown in FIG. 1, the CDMA RAN 12 supports wireless communication between one or more base stations (BTS) 18 and mobile stations (MS) 20. In accordance with CDMA principles known in the art, the BTS 18 can communicate with base station controllers (BSC) 22. The preferred CDMA RAN 12 shown in FIG. 1 uses cdma2000, and specifically uses cdma2000 1x, cdma2000 3x, or cdma2000 high data rate (HDR) principles.

In one non-limiting embodiment the mobile station 20 is a mobile telephone made by Kyocera, Samsung, or other manufacturer that uses Code Division Multiple Access (CDMA) principles and CDMA over-the-air (OTA) communication air interfaces. The present invention, however, applies to other mobile stations such as laptop computers, wireless handsets or telephones, data transceivers, or paging and position determination receivers. The mobile station 20 can be hand-held or portable as in vehicle-mounted (including cars, trucks, boats, planes, trains), as desired. However, while wireless communication devices are generally viewed as being mobile, it is to be understood that the present invention can be applied to "fixed" units in some implementations. Also, the present invention applies to data modules or modems used to transfer voice and/or data information including digitized video information, and may communicate with other devices using wired or wireless links. Further, commands might be used to cause modems or modules to work in a predetermined coordinated or associated manner to transfer information over multiple communication channels. Wireless communication devices are also sometimes referred to as user terminals, mobile stations, mobile units, subscriber units, mobile radios or radiotelephones, wireless units, or simply as "users" and "mobiles" in some communication systems.

Turning to the GSM core infrastructure 14, among other components the GSM core infrastructure 14 can include, for computer data transmission purposes, a gateway GPRS service node (GGSN) 24. Moreover, the GSM core infrastructure 14 can include a home location register (HLR) 26 that contains subscriber data for users of the GSM core infrastructure 14.

A hybrid CDMA/GSM switch 28 interconnects the CDMA RAN 12 and the GSM core infrastructure 14. In the preferred embodiment shown, the switch 28 includes a packet data serving node (PDSN) element 30 that communicates using CDMA protocols with the CDMA RAN 12 in accordance with PDSN operation known in the CDMA art. Moreover, the switch 28 includes a serving GPRS service node (SGSN) element 32 that communicates with the GSM core infrastructure 14 using GSM protocols in accordance with SGSN operations known in the GSM art. The elements 30, 32 communicate with each other in accordance with the disclosure below, such that use of the CDMA RAN 12 with the GSM core infrastructure 14 is facilitated without modifying the GSM core infrastructure 14 to use CDMA protocols, such as IS-41, but rather to use its own existing protocols.

Figure 2:
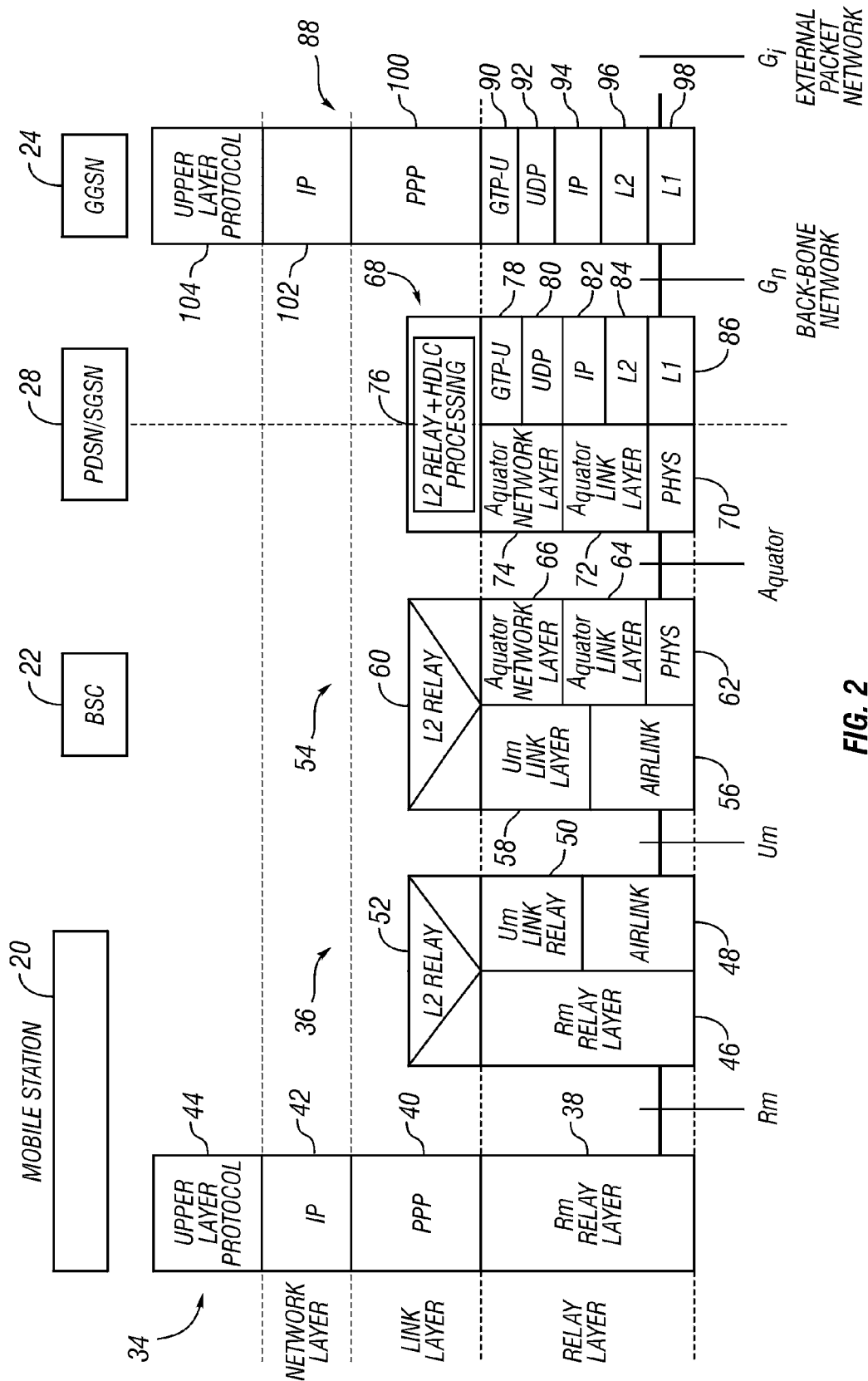
FIG. 2 is a schematic diagram showing the user plane protocols when the mobile station user has selected point-to-point protocol (PPP)

FIG. 2 shows various user plane protocol stacks that are used in the present invention when a user of the MS 20 has indicated that the Packet Data Protocol (PDP) type used in a computer data transmission is to be PPP. It is to be understood that although in CDMA 1x and HDR systems only PPP is used, to mimic GSM capabilities the CDMA-enabled MS 20 permits the user to specify either PPP or IP, without changing the CDMA standard and more particularly without changing cdma2000 1x. How the system 10 uses this user input is discussed further below.

First and second MS 20 air interface user protocol stacks 34, 36 represent CDMA air interface protocol stacks used by the MS 20 in accordance with CDMA 1x principles known in the art. For convenience, these user protocol stacks are described briefly herein. As shown, the first air interface user protocol stack 34 includes an Rm relay layer protocol 38 at the relay layer, and PPP 40 at the link layer as shown. The PPP 40 encapsulates IP 42 at the network layer. Upper level protocols 44 may be added on the IP 42.

In contrast, at the relay layer the second air interface user stack 36 includes an Rm relay layer 46 that communicates with the Rm relay layer 38 of the first stack 34. To communicate with the BSC 22, the second air interface stack 36 includes an airlink 48, and on top of the airlink 48 is a Um link layer protocol 50. An L2 relay at the link layer uses Um protocol for transmission to the BSC 22 in accordance with cdma2000 1x principles known in the art.

A BSC user protocol stack 54 enables the BSC 22 to communicate with the MS 20. As shown, the BSC protocol stack 54 includes an airlink 56 that communicates with the airlink 48 of the second MS 20 air interface stack 36. On top of the airlink 56 at the relay later is a Um link layer 58. These protocols are transformed by an L2 relay 60 at the link layer to protocols suitable for communicating with a cdma2000 1x PDSN. More specifically, the relay layer protocols that are used to communicate with the MS 20 are transformed to a suitable physical layer protocol 62, an $A_{quater}$ link layer protocol 64 on top of the physical layer protocol 62, and an $A_{quater}$ network layer protocol 66 at the relay layer in accordance with cdma2000 1x principles.

The physical layer 62 of the BSC stack 54 is connected to a switch user stack 68 and more specifically to a physical layer 70 of the switch stack 68 that is implemented by the PDSN element 30 of the switch 28. On top of the physical layer 70 is an $A_{quater}$ link layer protocol 72 that corresponds to the $A_{quater}$ link layer protocol 64 of the BSC stack 54 and an $A_{quater}$ network layer protocol 74 that corresponds to the $A_{quater}$ network layer 66 of the BSC stack 54 in accordance with cdma2000 1x principles.

On top of the above-described relay layer protocols, the switch user stack 68 includes, at the link layer, an L2 relay and processing layer 76. The layer 76 transforms/reformats the above-mentioned CDMA RAN protocols into the following GSM protocols that are implemented by the SGSN element 32 of the switch 28, in order from top to bottom at the relay layer: a GPRS Tunneling Protocol—User Plane (GTP-U) layer 78, an appropriate user datagram protocol (UDP) layer 80, an IP layer 82, and appropriate L2 and L1 layers 84, 86.

The switch 28 communicates by means of the GSM protocol stack with the GGSN 24 shown in FIG. 1. For completeness, the user protocol stack 88 implemented by the GGSN 24 includes, in accordance with conventional GSM principles known in the art, a relay layer that mirrors that of the SGSN element 32 as follows, in order from top to bottom at the relay layer: a GTP-U layer 90, a UDP layer 92, an IP layer 94, and L2 and L1 layers 96, 98.

On top of the relay layer at the link layer is a PPP layer 100, which encapsulates the IP 102 at the network layer. Appropriate upper layer protocols 104 can be used.

Figure 3:
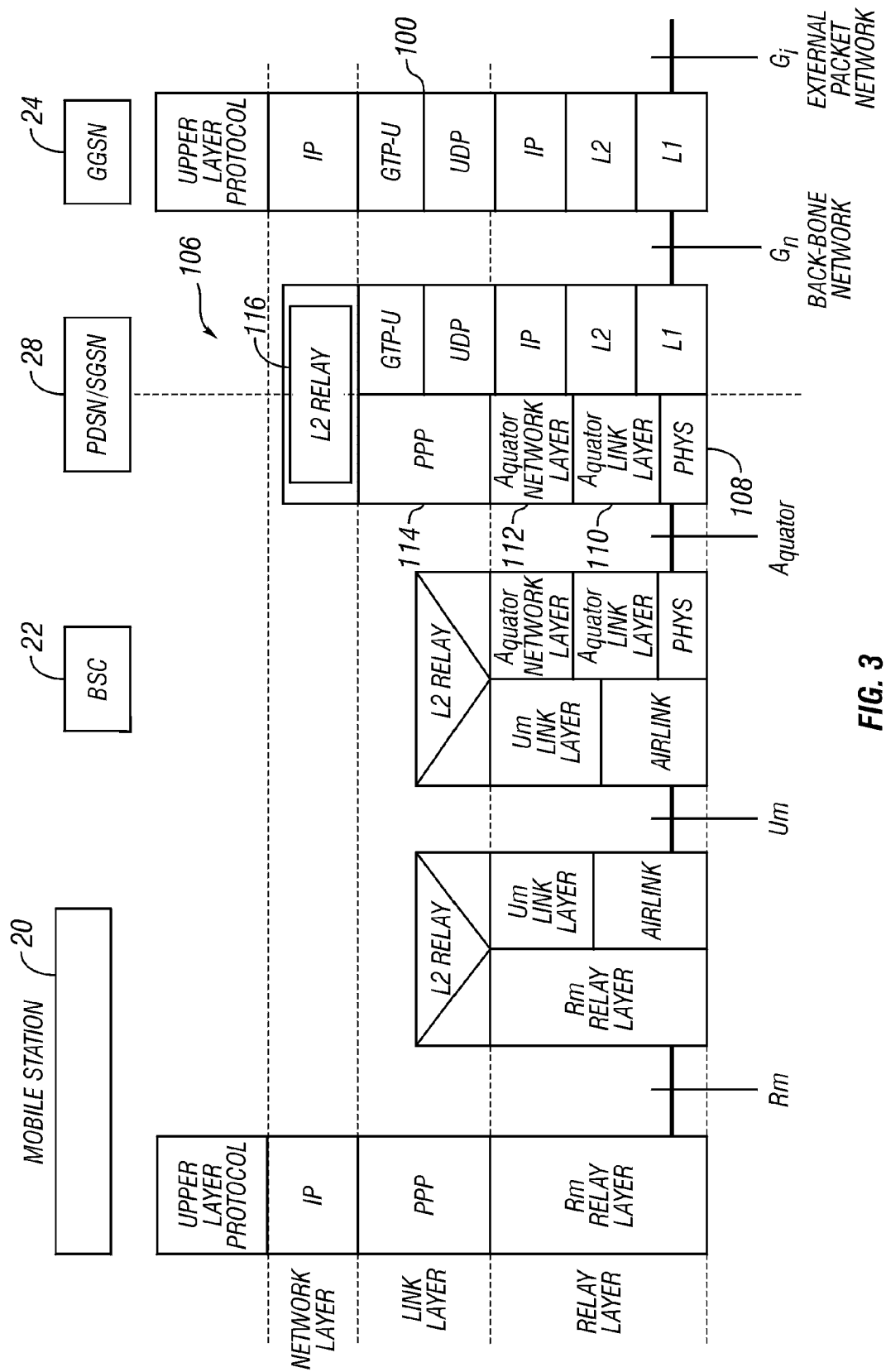
FIG. 3 is a schematic diagram showing the user plane protocols when the mobile station user has selected Internet protocol (IP)

As indicated above, while cdma2000 1x mobile stations use PPP to encapsulate IP, in GSM systems the mobile stations can permit the user to select whether he or she wants to use PPP to encapsulate IP or not. Accordingly, the preferred MS 20 includes a user selection means, such as a menu selection or switch or other means, by which a user can designated a PDP type as being "IP". FIG. 3 shows that the protocols that are used are identical at the MS 20, BSC 22, and GGSN 24 to those that are used when the user selects PDP type as being PPP. On the other hand, the user protocol stack 106 implemented by the switch 28 differs slightly when IP is designated as the PDP type from the user stack 68 that is used when PPP is selected. More specifically, the user protocol stack 106 includes a physical layer 108 and $A_{quater}$ link layer 110 and $A_{quater}$ network layer protocol 112 that correspond to the $A_{quater}$ link and network layers of the BSC stack, but at the link layer the switch stack 106 shown in FIG. 3 includes a PPP layer 114 that terminates the encapsulating PPP from the IP received from the CDMA RAN. For data proceeding the other way, the PPP layer 114 encapsulates in PPP any IP data from the GSM core. In this way, the GSM feature of being able to select a PDP type is preserved without modifying the CDMA MS 20 to actually use anything other than PPP.

An L2 relay layer 116 then functions to transform between the above-mentioned CDMA RAN protocols and the GSM protocols as set forth above. It is to be recognized from FIG. 3 that the GTP-U layers of the switch 28 and GGSN 24 can exist at the link layer of the user protocol stacks when IP is selected as the PDP type, whereas these layers exist at the relay layer when PPP is selected.

Figure 4:
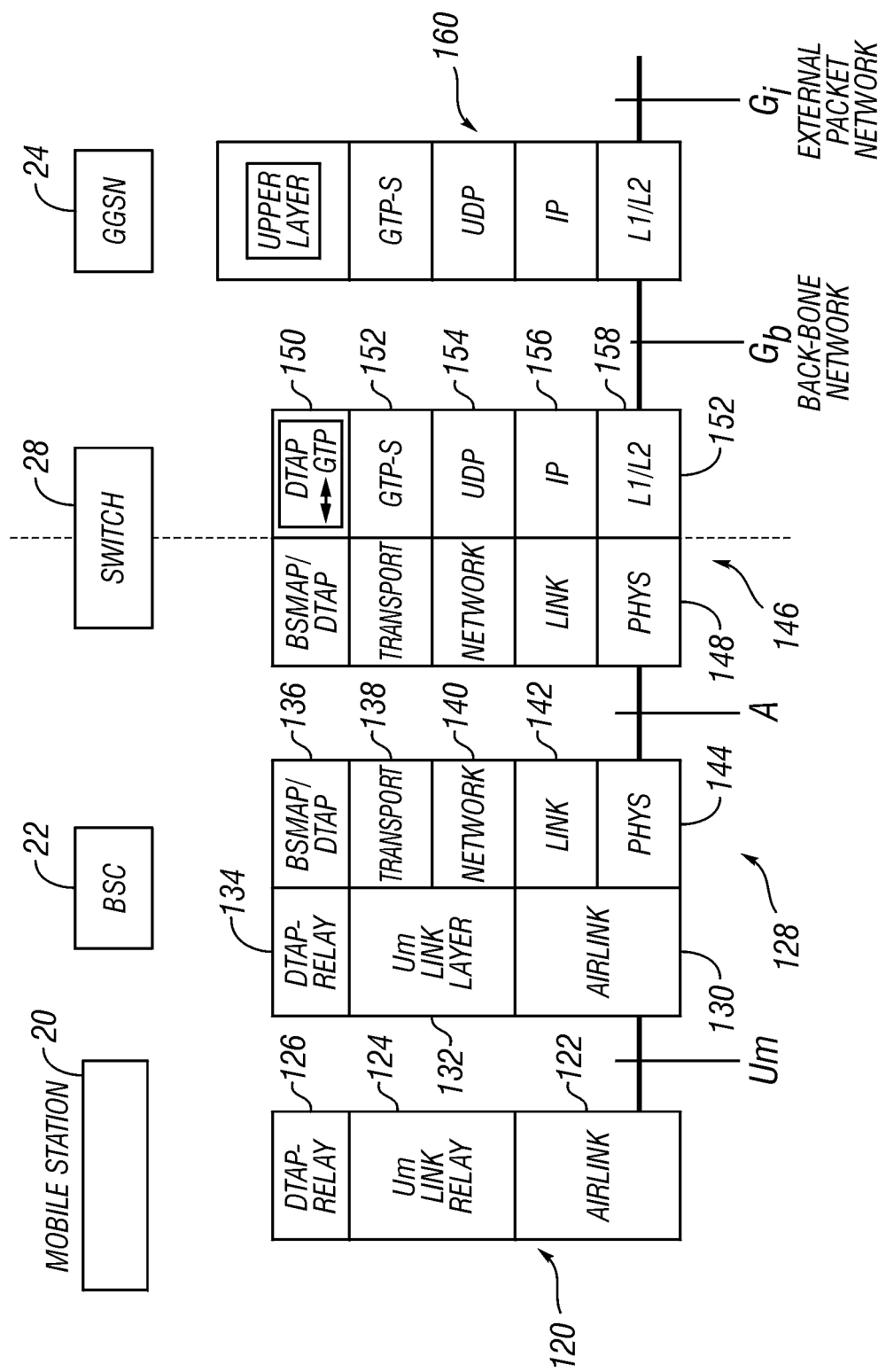
FIG. 4 is a schematic diagram showing the signalling protocols for switch control.
Figure 5:
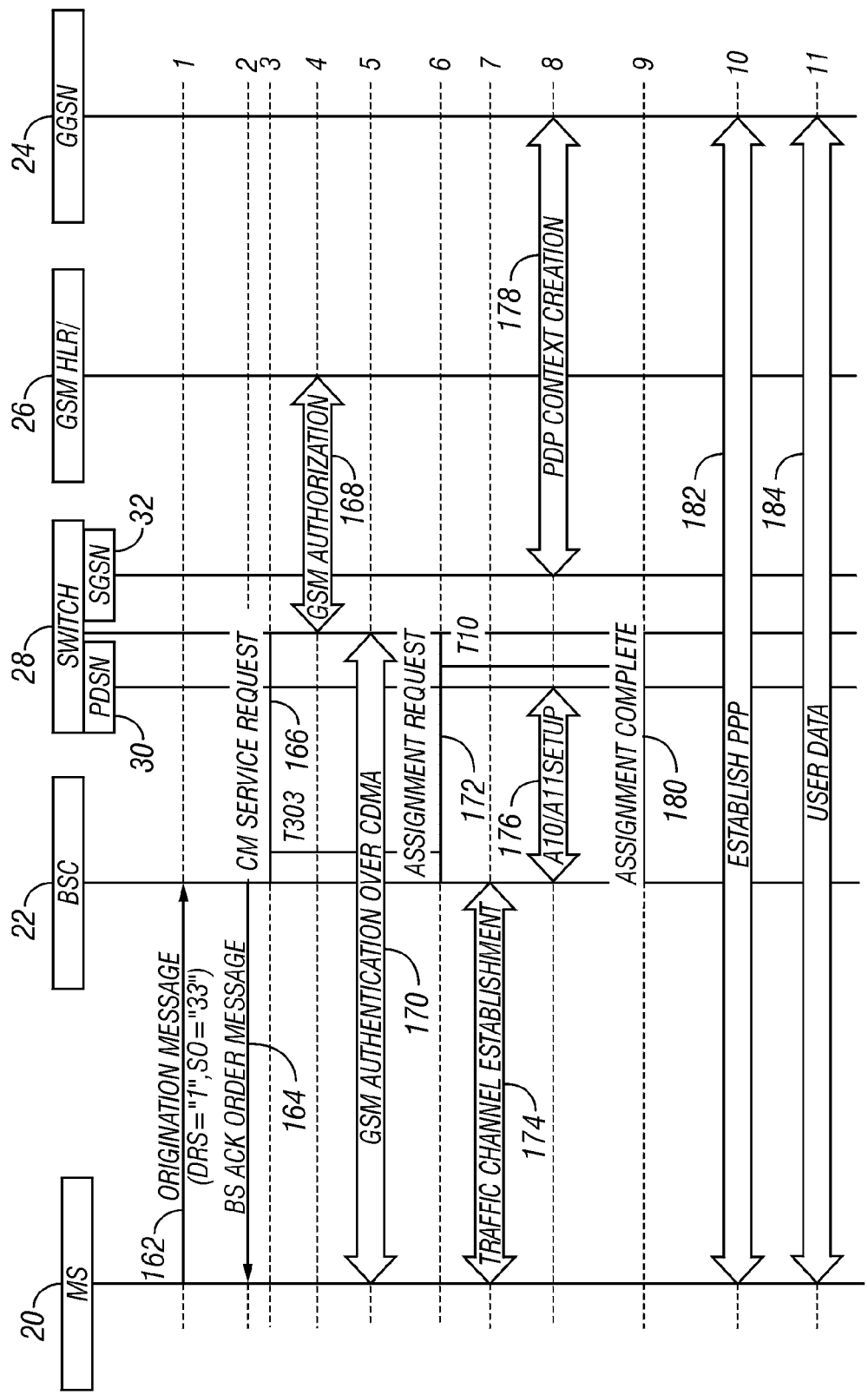
FIG. 5 is a schematic diagram showing the signalling messages that are used when the PDP context is created based on a profile stored in the home location register (HLR) and PPP is specified, with the messages chronologically sorted from top to bottom in the figure.
Figure 6:
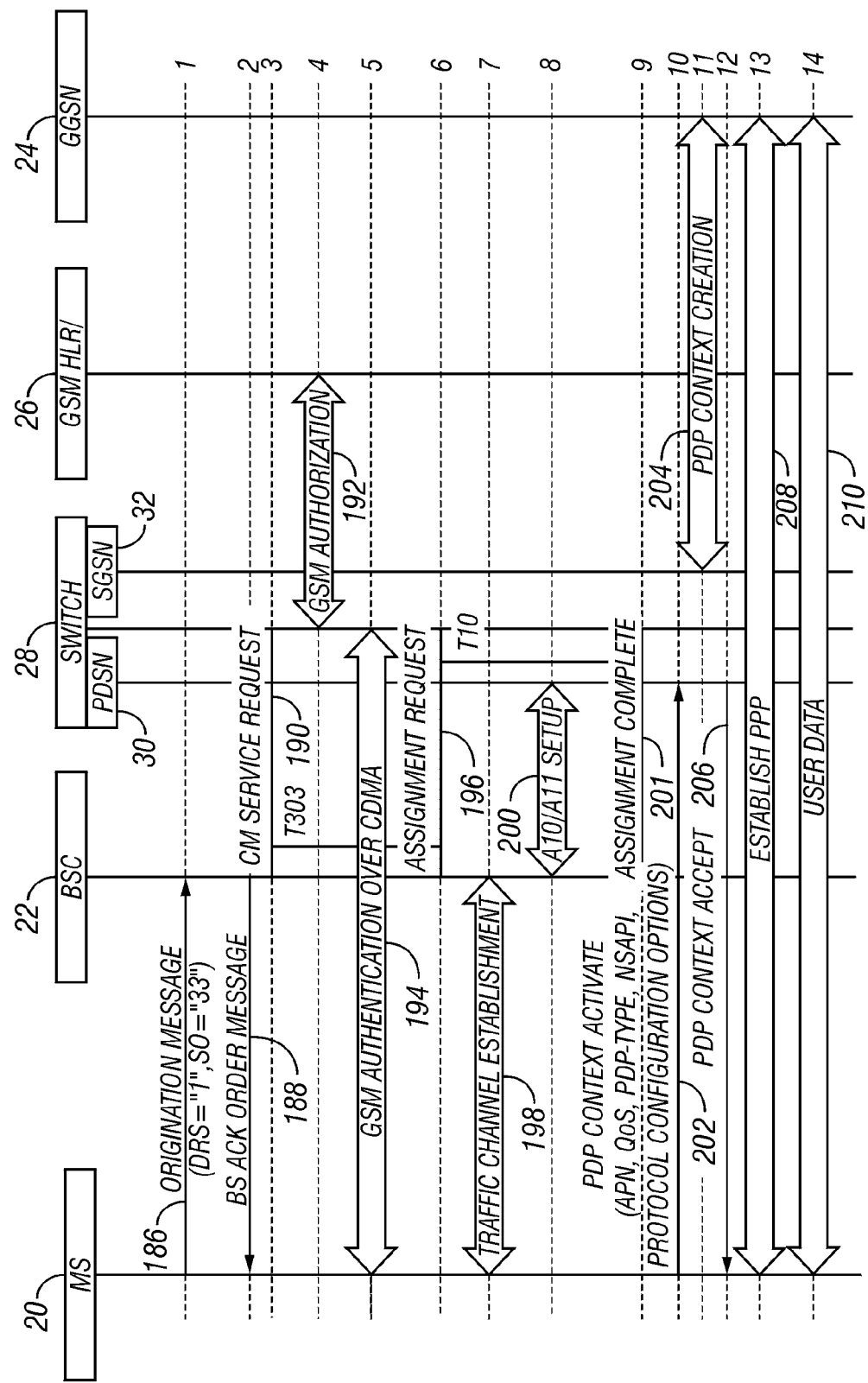
FIG. 6 is a schematic diagram showing the signalling messages that are used when the PDP context is created based on messaging from the mobile station itself, and PPP is specified, with the messages chronologically sorted from top to bottom in the figure.
Figure 7:
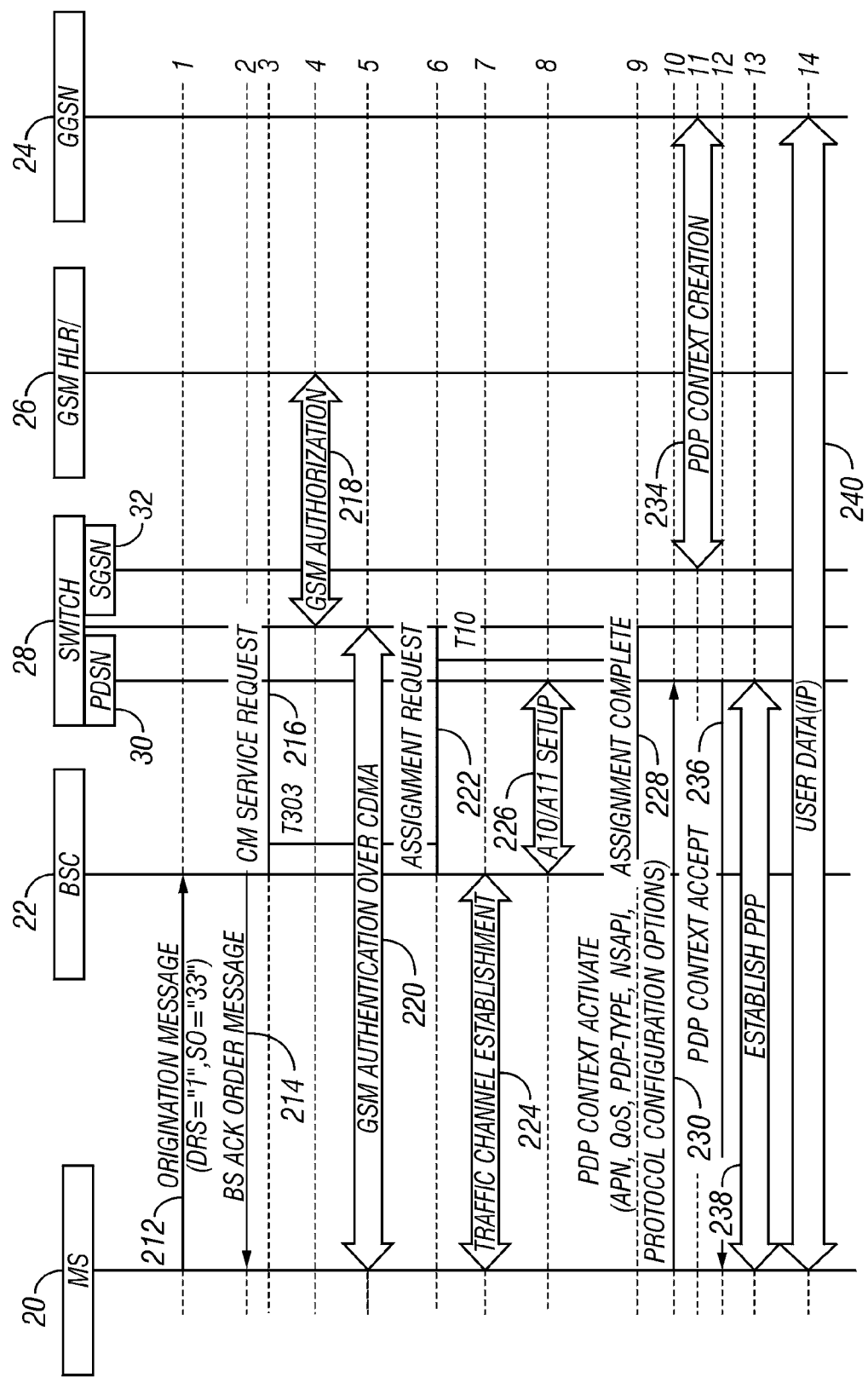
FIG. 7 is a schematic diagram showing the signalling messages that are used when the PDP context is created based on a profile specified by the mobile station itself, and IP is specified, with the messages chronologically sorted from top to bottom in the figure.

The protocol stacks that are used in the signalling or switching plane are shown in FIG. 4, with the signalling message flows shown in FIGS. 5-7 for various PDP selection options. In accordance with cdma2000 1x principles known in the art, the MS 20 uses a signalling protocol stack 120 that includes an appropriate airlink 122, Um link layer 124, and data transfer a Direct Transfer Application Part protocol (DTAP) 126. This signalling stack is implemented at a BSC signalling stack 128 at a mobile station side by an appropriate airlink 130, Um link layer 132, and DTAP relay 134. The DTAP relay 134 on the mobile station side has a corresponding base station Mobile Application Part/Direct Transfer Application Part (BSMAP/DTAP) layer 136 on a core side of the stack 128. In contrast, the Um link layer 132 on the mobile station side of the stack 128 corresponds to a transport layer 138 and network layer 140 on the core side of the stack 128, and the airlink 130 on the mobile station side corresponds to an appropriate link layer 142 and physical layer 144 on the core side.

A switch signalling protocol stack 146 as implemented by the switch 28 includes a CDMA RAN side 148 that mirrors the core side of the BSC signalling stack 128 as shown. Also, the switch 28 implements a DTAP GPRS Tunneling Protocol—Singling (GTP-S) element 150 that transforms message formats between DTAP and GTP. Accordingly, on a GSM side 152, the switch signalling stack 146 includes, in order from top to bottom, a GTP-S layer 152, an appropriate UDP layer 154, an IP layer 156, and appropriate L2 and L1 layers 158. This GSM side 152 of the switch signalling stack 146 is mirrored in a GGSN signalling stack 160 as shown.

The protocol stacks shown in FIG. 4 preferably are used in the signalling message sequences shown in FIGS. 5-7. In the embodiment shown in FIG. 5, it is assumed that necessary MS 20 profile parameters are stored at the HLR 26 shown in FIG. 1, so that the PDP context is derived from the HLR profile. This is advantageous because it avoids having to modify the CDMA-based MS 20 to use anything other than the CDMA standard, e.g., it enables the MS 20 to use cdma2000 1x, cdma2000 3x, or CDMA HLR without modifying the standard. It is further assumed in FIG. 5 that the PDP type is to be PPP.

A cdma2000 origination message is sent from the MS 20 to the BSC 22 as indicated at line 162. In response, the BSC 22 sends back an acknowledgement at line 164, and also sends on to the switch 28 a service request at line 166. The switch 28 undertakes GSM authorization in accordance with GSM principles with the HLR 26 at bar 168, including obtaining subscription authorization.

At bar 170 the switch 28 executes authentication message exchanges with the MS 20 using in part the user profile obtained from the HLR 26. At line 172 a channel assignment request is made by the switch 28 to the BSC 22, with the traffic channel being established in the CDMA RAN at bar 174. A set up message exchange referred to as "A10/A11 setup" is then executed at bar 176 between the BSC 22 and the PDSN element 30 of the switch 28 as would occur between a CDMA BSC and PDSN were a CDMA core being used.

Contemporaneously with the A10/A11 setup exchange, a PDP context creation message exchange is executed between the SGSN element 32 of the switch 28 and the GGSN 24, to create a call within the GSM core infrastructure having the below-mentioned PDP parameters. Specifically, the user profile stored at the HLR 26 is used, with the profile preferably including PDP address, Quality of Service (QoS) parameters, Access Point Name (APN) that identifies a particular network or service (i.e. GGSN) to be used, and the protocol configuration parameters to be used by the selected GGSN.

A channel assignment complete message is then sent from the BSC 22 to the switch 28 at line 180, and PPP is established at bar 182. User computer data is then transmitted across the channel at bar 184.

FIG. 6 assumes that necessary MS 20 profile parameters are available at the MS 20, so that the PDP context can be activated by the MS 20. This is preferred for ease of use but requires modifications to the CDMA-based MS 20 in accordance with the message flow below. It is further assumed in FIG. 6 that the PDP type is to be PPP.

A cdma2000 origination message is sent from the MS 20 to the BSC 22 as indicated at line 186. In response, the BSC 22 sends back an acknowledgement at line 188, and also sends on to the switch 28 a service request at line 190. The switch 28 undertakes GSM authorization in accordance with GSM principles with the HLR 26 at bar 192, including obtaining subscription authorization.

Also, at bar 194 the switch 28 executes authorization message exchanges with the MS 20. At line 196 a channel assignment request is made by the switch 28 to the BSC 22, with the traffic channel being established in the CDMA RAN at bar 198. A "A10/A11 setup" is then executed at bar 200 between the BSC 22 and the PDSN element 30 of the switch 28.

The message sequencing of FIG. 6 departs somewhat from that of FIG. 5 at this point. More particularly, a channel assignment complete message is next sent from the BSC 22 to the switch 28 at line 201. Then, PDP context activation is executed by sending the above-mentioned PDP parameters, which are stored at the MS 20 in the embodiment represented by FIG. 6, from the MS 20 to the switch 28 at line 202 in the exiting CDMA messaging called Application Data Delivery System (ADDS). These PDP parameters include PDP type, which in FIG. 6 is assumed to have been selected as "PPP" by the user. This allows the MS 20 to send a GSM PDP context activation message in the CDMA air interface without changing the CDMA standard.

The PDP context within the GSM core infrastructure 14 is then established at bar 204. A PDP context acceptance message is sent as indicated at line 206 from the switch 28 to the MS 20, indicating that the context activated at line 202 has been accepted. PPP is established at bar 208 and user data is then transmitted across the channel at bar 210.

FIG. 7 assumes that necessary MS 20 profile parameters are available at the MS 20, so that the PDP context can be activated by the MS 20. Unlike the case of FIG. 6, however, FIG. 7 assumes that the PDP type will be designated IP.

A cdma2000 origination message is sent from the MS 20 to the BSC 22 as indicated at line 212. In response, the BSC 22 sends back an acknowledgement at line 214, and also sends on to the switch 28 a service request at line 216. The switch 28 undertakes GSM authorization in accordance with GSM principles with the HLR 26 at bar 218, including obtaining subscription authorization.

Also, at bar 220 the switch 28 executes authentication message exchanges with the MS 20. At line 222 a channel assignment request is made by the switch 28 to the BSC 22, with the traffic channel being established in the CDMA RAN at bar 224. A "A10/A11 setup" is then executed at bar 226 between the BSC 22 and the PDSN element 30 of the switch 28.

A channel assignment complete message is next sent from the BSC 22 to the switch 28 at line 228. Then, PDP context activation is executed by sending the above-mentioned PDP parameters, which are stored at the MS 20 in the embodiment represented by FIG. 7, from the MS 20 to the switch 28 at line 230. These PDP parameters include PDP type, which in FIG. 7 is assumed to have been selected as "IP" by the user.

The PDP context within the GSM core infrastructure 14 is then established at bar 234. A PDP context acceptance message is sent as indicated at line 236 from the switch 28 to the MS 20, indicating that the context has been accepted. PPP is established at bar 238 but only between the MS 20 and the switch 28, in accordance with the disclosure above. This is because, as will be recalled, when "IP" is selected the PPP from the MS 20 is terminated at the switch 20 (conversely, IP from the GSM core infrastructure 14 is encapsulated with PPP prior to sending it on to the MS 20). User data is then transmitted across the channel at bar 240.

While the particular SYSTEM AND METHOD FOR DATA PACKET TRANSPORT IN HYBRID WIRELESS COMMUNICATION SYSTEM as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

What is claimed is:

1. A switch for supporting wireless communication, comprising:
    a first element communicating with a code division multiple access (CDMA) radio access network (RAN), the first element using a CDMA protocol;
    a second element communicating with a GSM core infrastructure, the second element using a GSM protocol; and
    a third element configured to reformat the CDMA protocol into the GSM protocol at a first layer of a data stack when a first packet data protocol (PDP) type is designated, and configured to reformat the CDMA protocol into the GSM protocol at a second layer of the data stack when a second PDP type is designated,
    wherein the first and second elements communicate with each other via the third element, whereby use of the CDMA RAN with the GSM core infrastructure is facilitated.

2. The switch of claim 1, wherein the first element is a packet data serving node (PDSN) element.

3. The switch of claim 2, wherein the PDSN element communicates with a CDMA base station controller (BSC).

4. The switch of claim 1, wherein the second element is a serving GPRS service node (SGSN) element.

5. The switch of claim 4, wherein the SGSN element communicates with a gateway GPRS service node (GGSN).

6. The switch of claim 1, wherein the switch transfers computer data between the CDMA RAN and GSM core infrastructure.

7. The switch of claim 1, wherein the switch terminates point-to-point protocol (PPP) framing from the CDMA RAN and sends Internet Protocol (IP) to the GSM core infrastructure in response to selection of IP by a user of a CDMA mobile station communicating with the CDMA RAN.

8. The switch of claim 1, wherein the first layer is a network layer and the first PDP type is Internet protocol (IP).

9. The switch of claim 1, wherein the second layer is a link layer and the second PDP type is point-to-point (PPP).

10. The switch of claim 1, wherein a General Packet Radio Service tunneling protocol (GTP) layer exists at the second layer of the data stack when the first PDP type is designated.

11. The switch of claim 1, wherein a General Packet Radio Service tunneling protocol (GTP) layer exists at a third layer of the data stack when the first PDP type is designated.

12. The switch of claim 11, wherein the third layer is a relay layer.

13. A method for facilitating the use of a CDMA RAN with a GSM core infrastructure, comprising steps of:
terminating point-to-point protocol (PPP) framing from the CDMA RAN and sending Internet Protocol (IP) to the GSM core infrastructure in response to selection of IP by a user of a CDMA mobile station communicating with the CDMA RAN; and
initiating packet data protocol (PDP) context activation including specifying at least one access point name from the CDMA mobile station,
wherein the terminating step and the initiating step are performed using a switch having a packet data serving node (PDSN) element communicating with the CDMA RAN using CDMA protocol and a serving GPRS service node (SGSN) element communicating with the GSM core infrastructure using GSM protocol, the elements of the switch communicating with each other via a processing element configured to reformat the CDMA protocol into the GSM protocol at a first layer of a data stack when a first packet data protocol (PDP) type is designated, and configured to reformat the CDMA protocol into the GSM protocol at a second layer of the data stack when a second PDP type is designated.

14. The method of claim 13, further comprising initiating PDP context activation including specifying at least one access point name from a GSM home location registry (HLR).

15. The method of claim 13, further comprising encapsulating IP from the GSM core infrastructure in point-to-point protocol (PPP) framing and transmitting the PPP to a CDMA mobile station in response to selection of IP by a user of the CDMA mobile station.

16. The method of claim 13, wherein PDP context activation is initiated without changing a CDMA standard used by the mobile station.

17. The method of claim 13, wherein the first layer is a network layer and the first PDP type is Internet protocol (IP).

18. The method of claim 13, wherein the second layer is a link layer and the second PDP type is point-to-point (PPP).

19. The method of claim 13, wherein a General Packet Radio Service tunneling protocol (GTP) layer exists at the second layer of the data stack when the first PDP type is designated.

20. The method of claim 13, wherein a General Packet Radio Service tunneling protocol (GTP) layer exists at a third layer of the data stack when the first PDP type is designated.

21. The method of claim 20, wherein the third layer is a relay layer.

22. A method for facilitating the use of a CDMA RAN with a GSM core infrastructure, comprising steps of:
terminating point-to-point protocol (PPP) framing from the CDMA RAN and sending Internet Protocol (IP) to the GSM core infrastructure in response to selection of IP by a user of a CDMA mobile station communicating with the CDMA RAN; and
initiating packet data protocol (PDP) context activation including specifying at least one access point name from a GSM home location registry (HLR),
wherein the terminating step and the initiating step are performed using a switch having a packet data serving node (PDSN) element communicating with the CDMA RAN using CDMA protocol and a serving GPRS service node (SGSN) element communicating with the GSM core infrastructure using GSM protocol, the elements of the switch communicating with each other via a processing element configured to reformat the CDMA protocol into the GSM protocol at a first layer of a data stack when a first packet data protocol (PDP) type is designated, and configured to reformat the CDMA protocol into the GSM protocol at a second layer of the data stack when a second PDP type is designated.

23. The method of claim 22, wherein the initiating step is performed using existing CDMA messages.

24. The method of claim 22, wherein the first layer is a network layer and the first PDP type is Internet protocol (IP).

25. The method of claim 22, wherein the second layer is a link layer and the second PDP type is point-to-point (PPP).

26. The method of claim 22, wherein a General Packet Radio Service tunneling protocol (GTP) layer exists at the second layer of the data stack when the first PDP type is designated.

27. The method of claim 22, wherein a General Packet Radio Service. tunneling protocol (GTP) layer exists at a third layer of the data stack when the first PDP type is designated.

28. The method of claim 27, wherein the third layer is a relay layer.

29. A wireless data communication system, comprising:
a CDMA RAN;
a GSM core infrastructure; and
at least one switch interconnecting the CDMA RAN and GSM core infrastructure, the at least one switch receiving and transmitting computer data using a CDMA protocol to communicate with the CDMA RAN, the at least one switch receiving and transmitting computer data using a GSM protocol to communicate with the GSM core infrastructure
wherein the at least one switch facilitates communication between the CDMA RAN and the GSM core infrastructure by reformatting the CDMA protocol into the GSM protocol at a first layer of a data stack when a first packet data protocol (PDP) type is designated. and reformatting the CDMA protocol into the GSM protocol at a second layer of the data stack when a second PDP type is designated.

30. The wireless data communication system of claim 29, wherein the at least one switch includes a first element communicating with the CDMA RAN and a second element communicating with the GSM core infrastructure.

31. The wireless data communication system of claim 30, wherein the first element is a packet data serving node (PDSN) element.

32. The wireless data communication system of claim 30, wherein the second element is a serving GPRS service node (SGSN) element.

33. The wireless data communication system of claim 32, further comprising at least one gateway GPRS service node (GGSN) communicating with the SGSN element.

34. The wireless data communication system of claim 29, wherein the at least one switch terminates point-to-point protocol (PPP) framing from the CDMA RAN and sends Internet Protocol (IP) to the GSM core infrastructure in response to selection of IP by a user of a CDMA mobile station communicating with the CDMA RAN.

35. An apparatus for supporting wireless communication, comprising:
 means for communicating with a code division multiple access (CDMA) radio access network (RAN), using a CDMA protocol;
 means for communicating with a GSM core infrastructure, using a GSM protocol; and
 means for reformatting the CDMA protocol into the GSM protocol at a first layer of a data stack when a first packet data protocol (PDP) type is designated, and reformatting the CDMA protocol into the GSM protocol at a second layer of the data stack when a second PDP type is designated,
 wherein the means for communicating with the CDMA RAN and the means for communicating with the GSM infrastructure communicate with each other via the means for transforming, whereby use of the CDMA RAN with the GSM core infrastructure is facilitated.

36. The apparatus of claim 35, wherein the first layer is a network layer and the first PDP type is Internet protocol (IP).

37. The apparatus of claim 35, wherein the second layer is a link layer and the second PDP type is point-to-point (PPP).

38. The apparatus of claim 35, wherein a General Packet Radio Service tunneling protocol (GTP) layer exists at the second layer of the data stack when the first PDP type is designated.

39. The apparatus of claim 35, wherein a General Packet Radio Service tunneling protocol (GTP) layer exists at a third layer of the data stack when the first PDP type is designated.

40. The apparatus of claim 39, wherein the third layer is a relay layer.

41. An apparatus for facilitating the use of a CDMA RAN with a GSM core infrastructure, comprising:
 means for communicating with the CDMA RAN using a CDMA protocol;
 means for communicating with the GSM core infrastructure, using a GSM protocol;
 means for reformatting the CDMA protocol into the GSM protocol at a first layer of a data stack when a first packet data protocol (PDP) type is designated, and reformatting the CDMA protocol into the GSM protocol at a second layer of the data stack when a second PDP type is designated;
 means for terminating point-to-point protocol (PPP) framing from the CDMA RAN and sending Internet Protocol (IP) to the GSM core infrastructure in response to selection of IP by a user of a CDMA mobile station communicating with the CDMA RAN; and
 means for initiating packet data protocol (PDP) context activation including specifying at least one access point name from the CDMA mobile station.

42. The apparatus of claim 41, wherein the first layer is a network layer and the first PDP type is Internet protocol (IP).

43. The apparatus of claim 41, wherein the second layer is a link layer and the second PDP type is point-to-point (PPP).

44. The apparatus of claim 41, wherein a General Packet Radio Service tunneling protocol (GTP) layer exists at the second layer of the data stack when the first PDP type is designated.

45. The apparatus of claim 41, wherein a General Packet Radio Service tunneling protocol (GTP) layer exists at a third layer of the data stack when the first PDP type is designated.

46. The apparatus of claim 45, wherein the third layer is a relay layer.

47. An apparatus for facilitating the use of a CDMA RAN with a GSM core infrastructure, comprising:
 means for communicating with the CDMA RAN using a CDMA protocol;
 means for communicating with the GSM core infrastructure, using a GSM protocol;
 means for reformatting the CDMA protocol into the GSM protocol at a first layer of a data stack when a first packet data protocol (PDP) type is designated, and reformatting the CDMA protocol into the GSM protocol at a second layer of the data stack when a second PDP type is designated;
 means for terminating point-to-point protocol (PPP) framing from the CDMA RAN and sending Internet Protocol (IP) to the GSM core infrastructure in response to selection of IP by a user of a CDMA mobile station communicating with the CDMA RAN; and
 means for initiating packet data protocol (PDP) context activation including specifying at least one access point name from a GSM home location registry (HLR).

48. The apparatus of claim 47, wherein the first layer is a network layer and the first PDP type is Internet protocol (IP).

49. The apparatus of claim 47, wherein the second layer is a link layer and the second PDP type is point-to-point (PPP).

50. The apparatus of claim 47, wherein a General Packet Radio Service tunneling protocol (GTP) layer exists at the second layer of the data stack when the first PDP type is designated.

51. The apparatus of claim 47, wherein a General Packet Radio Service tunneling protocol (GTP) layer exists at a third layer of the data stack when the first PDP type is designated.

52. The apparatus of claim 51, wherein the third layer is a relay layer.

\* \* \* \* \*